(12) United States Patent
Melkis et al.

(10) Patent No.: US 8,294,082 B2
(45) Date of Patent: Oct. 23, 2012

(54) PROBE WITH A VIRTUAL MARKER

(75) Inventors: Juris George Melkis, Longmont, CO (US); Ivan Faul, Boulder, CO (US); Dennis Toms, Estes Park, CO (US)

(73) Assignee: Boulder Innovation Group, Inc., Boulder, CO (US)

( * ) Notice: Subject to any disclaimer, the term of this patent is extended or adjusted under 35 U.S.C. 154(b) by 1256 days.

(21) Appl. No.: 11/939,654

(22) Filed: Nov. 14, 2007

(65) Prior Publication Data
US 2009/0122008 A1    May 14, 2009

(51) Int. Cl.
*G02B 6/06* (2006.01)
(52) U.S. Cl. .......... 250/227.2; 250/216; 250/227.11; 463/30; 463/31; 463/34; 345/619; 345/629; 345/632; 345/633
(58) Field of Classification Search .......... 345/156, 345/157, 173, 175, 179, 180, 181, 619, 629, 345/632, 633; 463/30, 31, 36, 37, 39; 715/700, 715/702, 863, 866; 250/216, 227.11, 227.2
See application file for complete search history.

(56) References Cited

U.S. PATENT DOCUMENTS

| | | | |
|---|---|---|---|
| 6,256,016 B1 * | 7/2001 | Piot et al. ............... | 345/166 |
| 6,476,378 B2 * | 11/2002 | Nougaret et al. ........ | 250/227.11 |
| 6,478,432 B1 * | 11/2002 | Dyner .................. | 359/858 |
| 6,498,602 B1 * | 12/2002 | Ogawa ................ | 345/173 |
| 6,714,310 B1 * | 3/2004 | Tanaka et al. ........... | 356/614 |
| 6,788,286 B2 * | 9/2004 | Travers et al. .......... | 345/156 |
| 7,204,428 B2 * | 4/2007 | Wilson ................. | 235/494 |
| 7,397,464 B1 * | 7/2008 | Robbins et al. .......... | 345/173 |
| 7,646,379 B1 * | 1/2010 | Drennan et al. ......... | 345/177 |
| 2004/0179001 A1 * | 9/2004 | Morrison et al. ......... | 345/179 |

* cited by examiner

*Primary Examiner* — My-Chau T Tran
(74) *Attorney, Agent, or Firm* — The Marbury Law Group, PLLC

(57) ABSTRACT

A probe for use in a coordinate digitizing system includes an indicator, such as a pointing tip or crosshairs, and a marker, the location of which can be determined by a marker tracking system relative to a coordinate system. The probe is configured to effectively place the marker's virtual image—as seen by the tracker—at the same location as the indicator without blocking a user's view of the indicator.

42 Claims, 13 Drawing Sheets

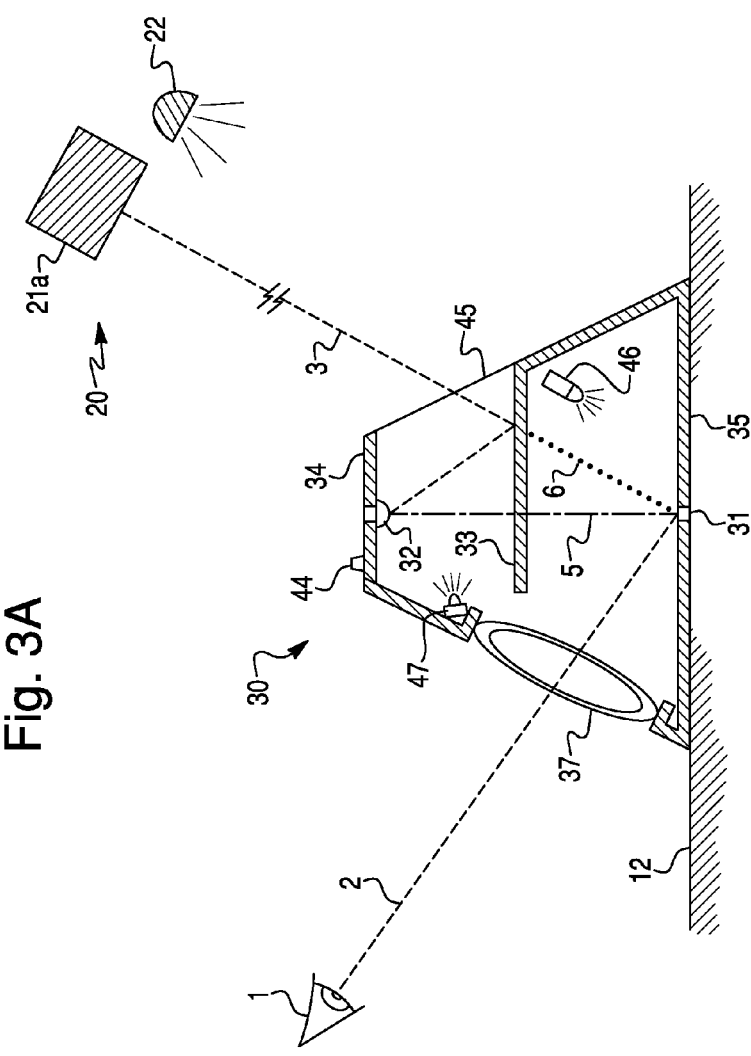
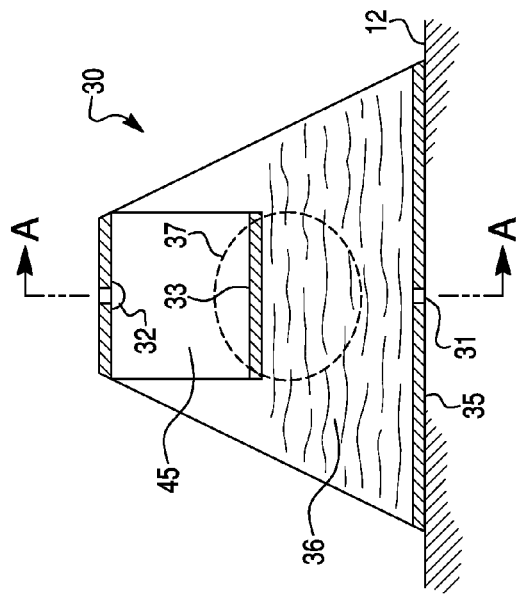
Fig. 3A
Fig. 3B

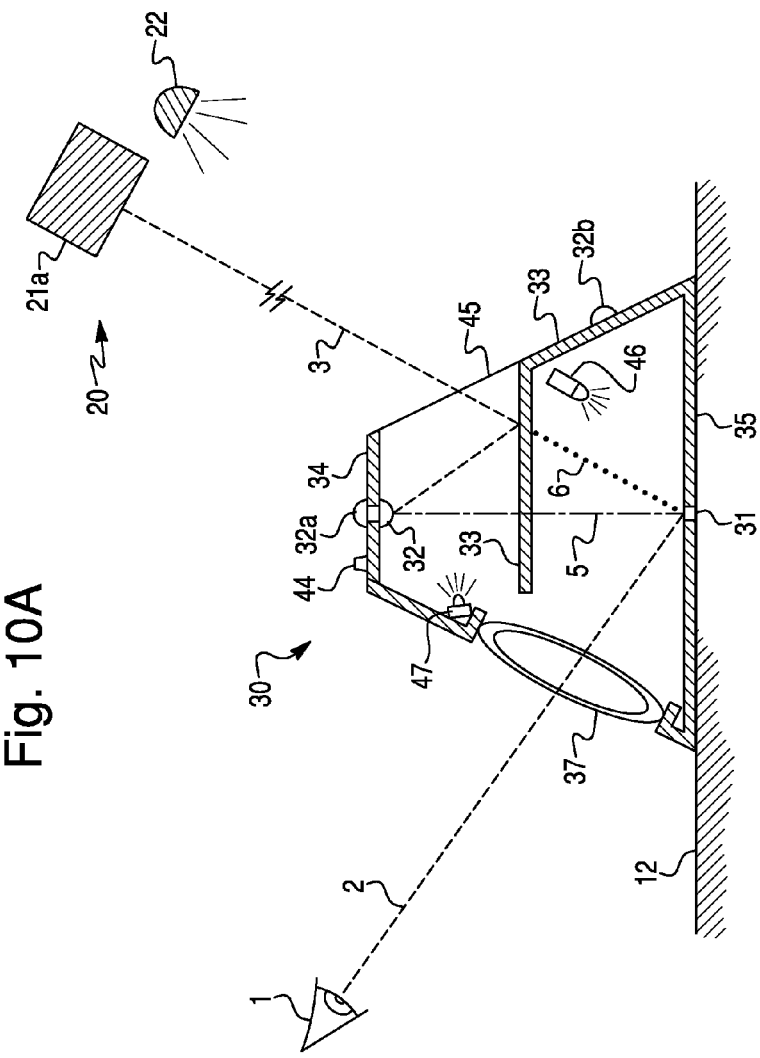
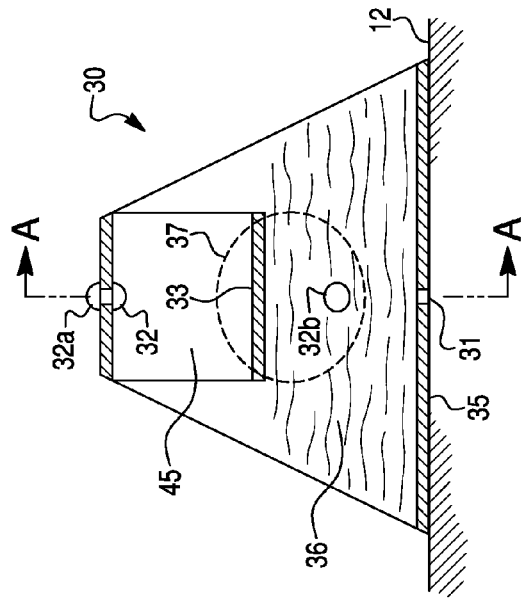
Fig. 10A
Fig. 10B

PROBE WITH A VIRTUAL MARKER

FIELD OF THE INVENTION

The present invention relates to methods and systems for optically measuring and locating points on two-dimensional surfaces or in three-dimensional volumes.

BACKGROUND OF THE INVENTION

Methods and systems for capturing coordinates of points—or locations—of real-world surfaces for input into computer-aided design (CAD) software are in widespread use. The points may be on a two-dimensional (2D) surface or on the exterior of a three-dimensional (3D) object. The process of inputting coordinates of points of a 2D medium or a 3D object into a computer memory is commonly called digitizing. For example, a digitizing tablet may be used to input XY coordinates of sampled points on a 2D image—such as a photograph, blueprint, or pencil-sketched drawing—in order to build a CAD or other computer graphics representation of the salient geometric features of the image.

Similarly, a "cloud of points" may be sampled from the 3D surface of a physical object to build a data representation (or model) of the geometry of the physical object in a computer memory. Each sampled point may be represented by an XYZ coordinate triple. In a more sophisticated representation, the cloud of points may be converted into vertices of abutting planar polygonal patches which approximate the surface of the object. In a more sophisticated representation, the cloud of points may be converted into abutting curved polygonal patches. Each patch, whether planar or curved, may be defined by a mathematical bivariate polynomial or rational function—such as in the NURBS surfaces commonly used in computer graphics. In special cases, 3D data entry may rely on real-world measurements where the generic geometric shape (e.g., circle, sphere, cube, cylinder, etc.) of a real-world object is known, but the dimensions of the shape must be determined by physically measuring the coordinates of one or more points to quantify the shape.

Numerous approaches exist for measuring real-world surface points. For planar media, various 2D digitizing tablets are commercially available which are commonly used in computer-aided drafting and design. The two most common input devices are a hand-held pen-like stylus with a pointing tip, and a manually moveable cursor—also called a puck. The movable cursor may have a reticle scribed into a transparent plate which can be moved over the surface of the tablet or a planar medium on the tablet. A common form of a reticle is pair of crosshairs. The reticle may include an indicator, such as an arrow tip or the intersection of the crosshairs, which indicates the particular surface point to be measured by the moveable cursor.

A probe may be used to input of points on the surface of a 3D object. Such a probe may have a pointer, tip, or other indicator for indicating an individual location on the object. The indicator may be a sharp conical pointer, a spherical tip of known radius, a grooved tip for tracing edges, or a roller of known radius.

Generally, the location of the indicator on the probe, cursor, or puck is measured in two or three dimensions by a coordinate measuring system, referred to herein as a tracker. The tracker may not track the indicator directly, but instead track sensible markers spaced apart from the indicator. In many cases, placing a sensible marker exactly at the location of the indicator would be problematic, because the size or the opacity of the marker may obscure the indicator from view. This problem may be avoided by tracking two or more markers positioned with a known geometrical relationship with respect to the indicator, so the location of the indicator may be computed from the locations of the markers.

SUMMARY OF THE INVENTION

The various embodiments provide methods and systems for measuring a 2D or 3D location in a coordinate system using only one marker on a probe. The probe contains an indicator to designate the location of a specific point on a 2D surface or in a 3D volume for the measurement of the location. A single trackable marker on the probe effectively has the same location as the indicator without blocking a user's view of the indicator. An embodiment measures the location of the marker with a tracker, which may report the location as 2D or 3D coordinates in a coordinate system.

An embodiment is configured so that the indicator lies at a known offset and at a constrained direction from the marker. An embodiment for a planar or 2D application positions the marker and the indicator on the same line normal (perpendicular) to the surface. An embodiment for 3D applications uses the known offset and direction of the marker to compute the location of the indicator in the plane of the medium.

Another embodiment virtually collocates a probe's marker and indicator by using a mirror—or an equivalent reflecting surface for a sonic marker. In this embodiment, the indicator and the marker lie on opposite sides of the mirror's reflecting surface at equal distances from the reflecting surface and on a line perpendicular to the reflecting surface. This configuration causes the location of a virtual image of the marker to coincide with the location of the indicator. In alternative embodiments, the mirror may be planar or non-planar.

A portion of the probe including the marker and the mirror may be hinged or moveable as long as the image of the marker continues to coincide with the indicator.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

FIG. 3A is a side cross-sectional view of a probe embodiment having a magnifying lens.

FIG. 3B is a rear cross-sectional view of the embodiment shown in FIG. 3A.

FIG. 10A is a side cross-sectional view of a probe embodiment having a secondary marker.

FIG. 10B is a rear cross-sectional view of the same embodiment as shown in FIG. 10A.

DETAILED DESCRIPTION OF THE PREFERRED EMBODIMENTS

Figure 1:
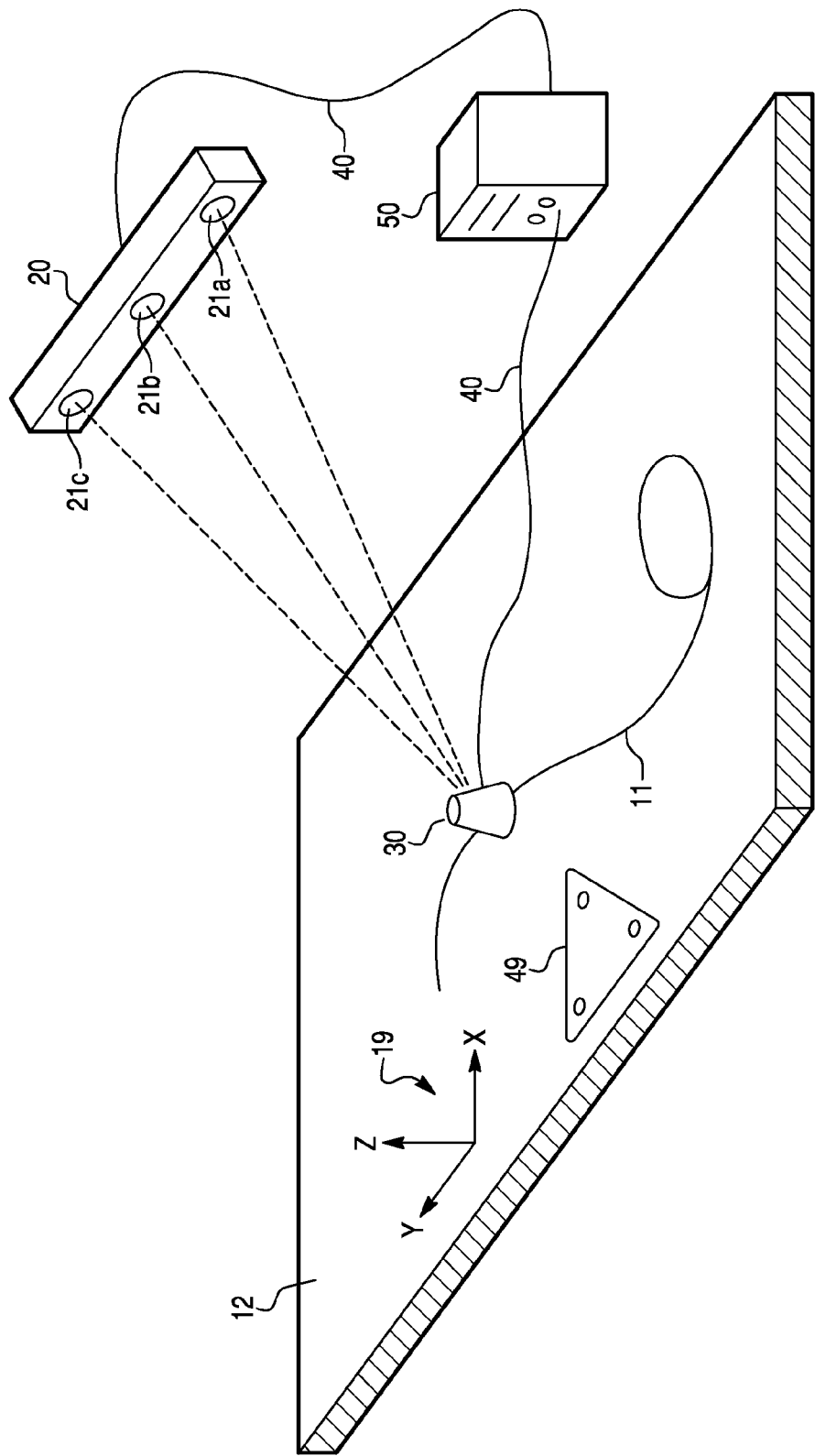
FIG. 1 is a perspective view of an embodiment of a probe for 2D input.

Various embodiments of the present invention will be described in detail with reference to the accompanying drawings. Wherever possible, the same reference numbers will be used throughout the drawings to refer to the same or like parts.

Generally, the location of the indicator of a probe of a 2D digitizing tablet or a 3D tracking system is measured relative to a coordinate system. The coordinate system typically may be a standard Cartesian (rectangular) coordinate system, possibly defined by the user with respect to the medium or object being digitized. The location of the indicator of a probe relative to the coordinate system is typically determined by a marker coordinate measurement system, referred to herein as a tracker. For digitizing points on a plane, the tracker typically reports the location of the indicator of a 2D probe as numerical X and Y coordinates. An example of a 2D tracker is a planar digitizing tablet, which may be constructed with marker location sensing wires buried in the digitizing tablet. A family of such tablets is available from Wacom Technology Corp. (Vancouver, Wash.). For digitizing points in a 3D volume, the tracker typically reports the location of the indicator of a 3D probe as X, Y, and Z coordinates. An example of a handheld, optically tracked probe and its 3D tracker are the FlashPoint and 3D Creator products sold by Boulder Innovation Group, Inc. (Boulder, Colo.).

Both 2D and 3D probes generally incorporate at least one localized, trackable, physically sensible marker. Each sensible physical marker is a feature which defines a reference point on the probe. A marker may be a point-like light source, a light detector, a retro-reflector, a high-contrast target pattern, a sound emitter, a magnetic coil, or another sensible physical feature. The location of each marker may be measured essentially continuously by the tracker. For example, each marker may have an optical characteristic, such as an illuminated spot having a centroid, the location of which is precisely measured by an optical tracker. Optical trackers may measure the marker location using visible, infrared or ultraviolet spectra. Other types of trackers measure the location of a marker on a 2D surface or in a 3D volume using ultrasound or magnetic fields instead of light.

A reticle of a cursor and the pointing tip of a probe both are referred to herein as an indicator. The stylus, cursor, or puck for 2D digitizing and the probe used for 2D or 3D digitizing are referred to as a probe. Each probe includes an indicator that indicates the specific, single point on which the indicator lies or which the indicator contacts at a given moment.

It has often been impractical to locate a single sensible marker at exactly the same location on the probe as the indicator. One reason is that markers, being generally opaque, would block a user's view of the indicator if collocated with the indicator. That is, the indicator effectively would be inside and at the very center of the marker. Thus, the marker make it difficult for the user to position the indicator on the point to be measured (i.e., digitized). Aside from visibility problems, the physical volume of the marker would prevent the user from touching the indicator directly to the point to be digitized. For example, some optical trackers use a retro-reflective one-centimeter ball as a marker. That size marker would completely envelop and optically block the indicator if the indicator and marker were positioned concentrically on the probe. To resolve this problem, many probes include markers located some distance from the indicator to allow a user to visually place the indicator of the probe at a desired point for measurement. A tracker can measure the location of the marker and then compute the location of the indicator given the known offset and direction.

Many trackers only measure the location of a marker and not its orientation, especially when the marker is omni-directional, such as a single light-emitting diode (LED) or a retro-reflective ball. Consequently, a tracker cannot determine the location of the indicator based on the location of an omni-directional marker since it cannot determine the rotational orientation of the probe (and thus the offset direction of the marker with respect to the indicator). Therefore, a probe employing such markers generally requires at least two spaced-apart markers for 2D measurements and at least three spaced-apart markers for 3D measurements. Using the known relationship of the markers to the indicator and from the measured coordinates of the multiple markers, the coordinates of the indicator may be computed using well-known techniques of analytic geometry.

For example, there may be at least two markers at known distances from the indicator of the probe. Then, a tracker may compute the spatial coordinates of the indicator given the measured coordinates of the two markers. More generally, there may be three or more markers in known geometric relationships to the indicator. Techniques for computing the coordinates of the indicator from the measured coordinates of at least three markers are well known to persons of ordinary skill in the art of 2D or 3D digitizing. Commercial 2D digitizing tablets and 3D trackers and their probes regularly employ multiple markers on a probe for computing the location coordinates of the indicator on the probe.

Nevertheless, it can be advantageous to use only one marker on a probe. For example, some trackers do not measure the location coordinates of multiple markers at exactly the same moment. With such trackers, any motion of the probe between measurements can introduce error into the computation of the indicator location. Using only one marker on the probe with the marker collocated with the indicator can avoid such errors.

FIG. 1 shows an embodiment of a probe 30 for use in digitizing points of interest on a planar medium or other surface 12 in conjunction with a tracker 20 coupled to a computer 50 by a data cable 40 (or wireless data link). The probe 30 is positioned on points to be digitized so the coordinates of the points can be measured by determining the position of a marker using a 2d or 3D tracker 20. For example, the probe 30 may be used to indicate and measure sample points along a line 11 in conjunction with the 3D tracker 20 to generate XY coordinates of the line 11 for storage in a computer 50. In this example, the surface 12 may be assumed to coincide with the XY plane of the 3D coordinate system 19. In such a configuration, an XY coordinate system can be used for recording coordinates of the line 11 as is typical for 2D digitizing applications. A 3D tracker 20 may provide a set-up feature which allows a user to define the origin and the X and Y axes so that the coordinate system corresponds to the surface 12. In that situation, the Z coordinates of the locations of the probe 30 may be ignored or discarded. An example of a tracker 20 is the FlashPoint system of Boulder Innovation Group (Boulder, Colo.), which provides two functions (the OXY and XXY commands) that enable a user to define such a custom coordinate system.

Alternatively, a reference frame 49 with its own sensible markers may be attached to the surface 12 and measured by the tracker 20 to register the coordinate system 19 of the tracker 20 with respect to the markers of the reference frame 49. Thereafter, as long as the reference frame 49 remains fixed, the coordinate system of the tracker 20 remains fixed with respect to the reference frame 49, and therefore fixed with respect to the surface 12. This remains true even when the tracker 20 is moved with respect to the surface 12. To register the tracker 20, In use, the tracker 20 records the coordinates of one or more points of the surface 12 and communicates this information via a data cable 40 to the computer 50 for storage. Recording may conditionally take place when the user presses a button (41 in FIG. 2) on the probe 30 (whose signal may be conveyed to the computer 50 by a data cable 40), depresses a foot switch, gives a verbal command, or otherwise instructs the system to measure and record (digitize) a point or sequence of points to the computer 50. The computer 50 may collect and record the coordinates of the points in order to construct a CAD model, for example.

The tracker 20 illustrated in FIG. 1 may be an optical tracker. It may employ two or more video cameras in a conventional stereo arrangement. Alternatively, the tracker 20 may employ three linear charge-coupled devices (CCDs), such as used by the aforementioned Flashpoint system. In another embodiment, the tracker 20 may track point-like sources of sound, in which case the tracker 20 may include an array of microphones. In another embodiment, the tracker 20 may generate nutating magnetic fields which orthogonally oriented coils in the marker 30 can sense. Information from the marker coils may be communicated by a data cable 40 (or wireless data link) to the computer 50 from which the computer 50 can derive the location and orientation of the indicator. Without implying limitation, further descriptions of digitizing systems will be based upon optical trackers 20.

Figure 2:
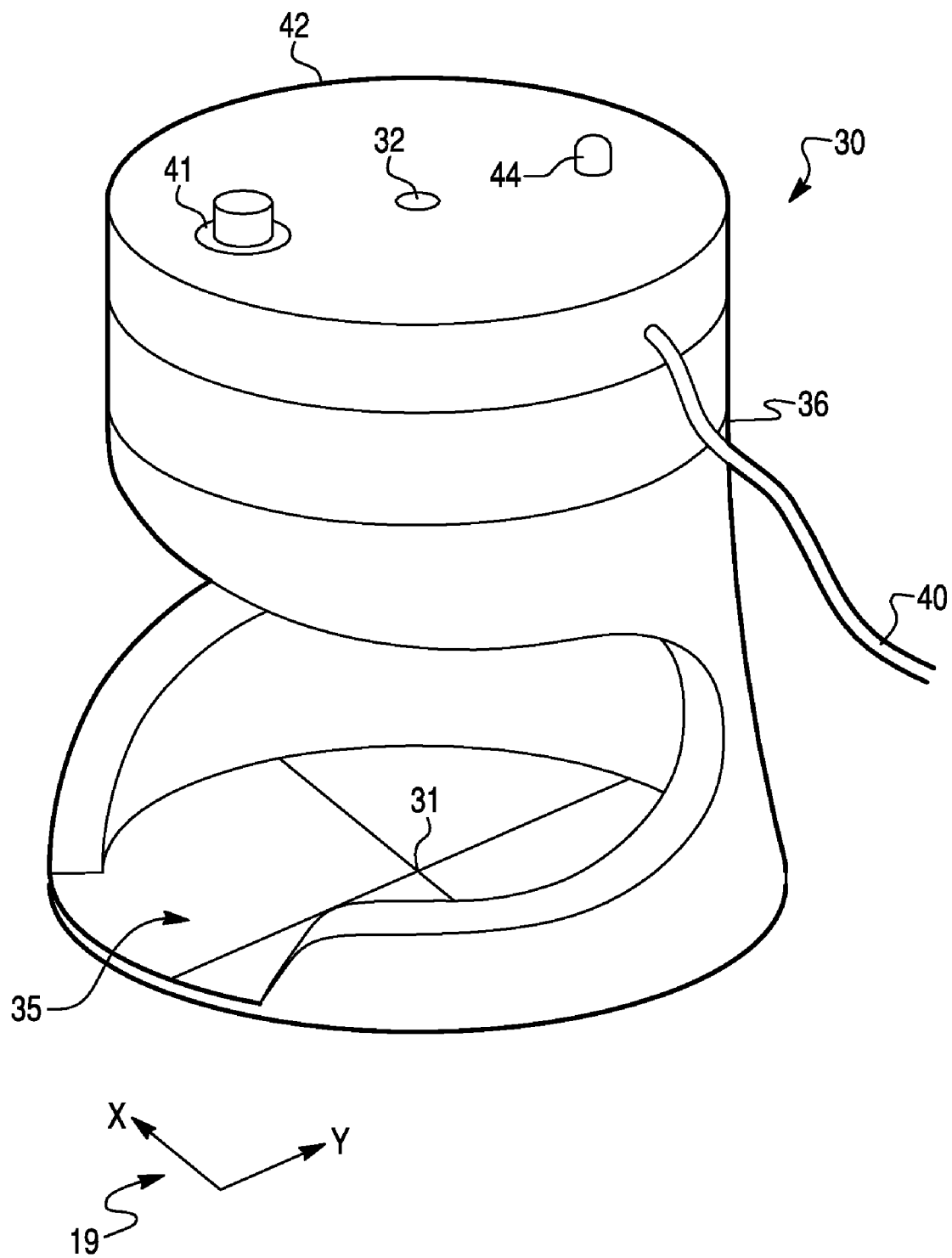
FIG. 2 is a perspective view of an embodiment of a probe without a marker reflector (mirror).

FIG. 2 shows an embodiment of a probe 30 that includes a housing 36 supporting a top cap 42 and a transparent base plate 35 having an indicator 31 in the form of crosshairs scribed thereon. A marker 32, such as a light or retroflector ball, may be positioned in the top cap 42 in line with the indicator 31. Also, the probe 30 may include a button 41 and signal generation circuitry for signaling when a coordinate measurement should be taken, coupled to a data cable 40 for sending signals from the button 41 to the computer 50. The probe may also include a status light 44 on the end cap 42 for indicating a status of the probe.

In an embodiment, the indicator 31 is scribed on the bottom of the transparent plate 35 so there can be no angular disparity between the location of the intersection of the indicator 31 and the point directly under the indicator 31. In this embodiment, the transparent plate 35 may be glass or plastic. In an alternative embodiment, the base plate 35 may be a thin slab of optical fiber image conduit, which optically raises the image of the surface 12 to the top of the base plate 35, so the indicator 31 may be scribed on the top of the base plate 35. In this embodiment, the optical fiber image conduit prevents any refractive shift (disparity) between the image of the surface 12 under the base plate 35 and the indicator 31.

During use of the probe 30, the base plate 35 and the indicator 31 are in contact with a surface 12 to be measured. The marker 32 is at a known offset from the indicator 31 and on the line from the indicator 31 perpendicular to the plane of the base plate 35. The marker 32 is offset from (e.g., positioned above) the indicator 31 in order not block the line-of-sight between the indicator 31 and a user. The offset enables the user 1 to place the indicator 31 of the probe 30 at the clearly visible location on the surface 12. The tracker 20 can determine the XY coordinates of the indicator 31 by measuring the coordinates of the marker 32 and by compensating for the known offset in the perpendicular direction of the marker with respect to the indicator 31.

The probe 30, shown as a puck in FIG. 2, includes a structural housing 36 to maintain the fixed geometric relationship between the indicator 31 and the marker 32. A part of the housing 36 may be transparent or open to provide ambient light to the indicator 31 and the surface 12 so as to allow the user 1 to see the indicator 31 and the underlying image being digitized.

The button 41 on the probe 30 may be pressed to control when XY coordinate measurements are made. Any well known switch circuit (not shown separately) may be mechanically coupled to the button 41, so that when a user pressing the button, an electrical signal (e.g., closing a circuit) is generated. In an embodiment, button 41 may be coupled to digital circuits to generate a digital signal in response to a user pressing the button. The button and associated switch circuitry are connected to communication circuitry so that the signal can be transmitted to the computer, such as by means of the data cable 40. In a simple embodiment, the communication circuitry is a simple conductor so that when the button is pressed, closing the switch circuitry, electrical energy is communicated through the conductor through the data cable 40 to the computer. In another embodiment, the communication circuitry is a digital communication bus configured to convey a digital signal from the switch circuitry to the data cable 40. In a further embodiment in which data is transmitted wirelessly instead of by means of a data cable 40, the communication circuitry includes a wireless data link transceiver as are well known in the art that is configured to receive a digital signal from the switch circuitry and communicate the information in the signal to the computer wirelessly. In use, when the probe 30 is centered on a particular point, a user presses the button 41 which in conjunction with associated switch and communication circuitry sends a signal to the computer indicating that a location measurement of the marker 32 should be taken.

The probe 30 may include a status light 44, such as an LED, or an audio transducer (not shown) to inform the user of success or failure of a particular coordinate measurement. To provide this functionality, the computer 50 may activate status light 44 by sending signals via the data cable 40. For example, the computer 50 may cause the status light 44 to flash to inform the user of a problem, such as blocked line-of-sight between the marker 32 and the tracker 20. The cable 40 may also provide power to the marker 32. The data cable 40 may be electrical or optical, and may be unidirectional or bidirectional.

In an alternative embodiment, communication between the probe and the computer 50 may be by way of a wireless data link (not shown as it is invisible). Such a wireless link may transmit and/or receive radio waves, infrared, sound, some other wireless medium, or a combination thereof to communicate information to and from the computer 50. The probe 30 may include a self-contained energy source, such as a battery (not shown) for powering the status light 44, marker 32 (if necessary) and data communication circuitry.

The marker 32 may be any of a variety of sensible marker. The marker 32 may be an active, point-like source of light, such as a light-emitting diode (LED), which may flash or emit light continuously. An LED may emit an infrared or visible wavelength. The marker 32 may be a small retro-reflective spot or ball, in which case there may be one or more sources of light on or near the tracker 20 to illuminate the marker 32. The marker 32 may be a passive, distinctively-colored or high-contrast shape or pattern, lit only by ambient light. An example of such a passive pattern is the checkered pattern tracked by the Micron Tracker of Claron Technologies (Toronto, Ontario, Canada). For an ultrasonic tracker 20, the marker 32 may be a piezoelectric crystal or a spark gap which emit sounds. For a magnetic tracker 20, the marker 32 may be a set of three tiny orthogonal induction coils.

As illustrated in FIG. 2, an embodiment is configured to position the indicator 31 at a known offset distance from the marker 32 and at a constrained direction with respect to the base plate 35. For a planar or 2D application, the probe 30 may position the marker 32 and the indicator 31 on the same line perpendicular to the surface 12 (i.e., positioning the marker 32 directly above the indicator 31). This design maintains a constant offset direction of the marker 32 even as the probe 30 is rotated around the perpendicular while the indicator 31 maintains contact with a specific point on the surface 12. Being positioned on top of the probe 30, the marker 32 can be tracked in three dimensions, while the known offset and direction can be used to compute the location of the indicator 31 in the plane of the surface 12. In particular, if the coordinate system is defined so the surface 12 lies in the XY plane, then the indicator 31 lies on the XY plane while the marker 32 lies in a parallel plain offset by its elevation- or non-zero Z coordinate. Thus in this embodiment, the indicator 31 and the marker 32 have the same XY coordinates. The Z coordinate of the marker 32 may be ignored or set to zero to yield the coordinates of the indicator 31. If the coordinate system is not defined so that the surface 12 lies in the XY plane, well known analytic geometry methods can be used to project the coordinates of the marker 32 perpendicularly onto the plane of the surface 12 to yield the coordinates of the indicator 31.

FIGS. 3A and 3B show cross-section views of another embodiment of a probe 30. In this embodiment, the probe 30 is configured to collocate a virtual image of a marker 32 and the indicator by using a mirror 33 properly placed to create the virtual image. To avoid double reflections, the mirror 33 preferably is a first-surface mirror. A prism with internal reflection may also be used instead of a mirror 33. The indicator 31 and the marker 32 lie on opposite sides of the reflecting surface of the mirror 33 at equal distance from the reflecting surface of the mirror 33, and on a line 5 perpendicular to the reflecting surface of the mirror 33. An observation line 3 extends from the marker 32, is reflected in the mirror 33 and detected by a light sensor or camera 21a of the tracker 20. The reflection of the marker 32 creates a virtual image which appears at the end of line 6, which is the virtual continuation of the line-of-sight from the tracker 20 to the virtual image of the marker 32. The probe 30 is further configured so that a user can observe the indicator 31, such as illustrated by a ray of light following line 2 from the indicator 31 to the user eye 1. Because of the geometrical relationship between the indicator 31 and the marker 32 provided by the configuration of the probe 30, the apparent location of the virtual image of the marker 32 as viewed by the tracker 20 coincides with the actual location of the indicator 31 as observed the user. Therefore, the tracker 20 measures the location of the marker 32 as being at the same location as the indicator 31. Accordingly, there is no need to calculate the coordinates of the indicator 31 to account for an offset of the marker 32.

The embodiment illustrated in FIGS. 3A and 3B may include any or all of the following: a transparent base plate 35, a housing 34, a status indicator 44, and a button (not shown). The housing 34 may include a source of illumination 47 for illuminating the marker 32—if it is a passive marker—and/or a source of illumination 46 for illuminating the indicator 31. Further, the embodiment may include a window or magnifier, such as a lens 37, through which the user can observe the indicator 31. The lens 37 may be removable. The embodiment may include a transparent protective cover 45 to protect the mirror 33 from dust, scratches, fingerprints, or smudges, while allowing the tracker 20 to observe the mirror 33. A sliding shutter, removable cap, or a protective coating (not shown) on the mirror 33 may be used instead of or in addition to a transparent protective cover 45.

To prevent the tracker 20 from seeing both the reflected virtual image of the marker 32 and the marker 32 itself, there may need to be one or more appropriately-placed opaque baffles or opaque portions of the housing 34. The top of the probe 30 housing 34 may be opaque, serving as such a baffle and obstructing the direct line of sight between the tracker 20 and the marker 32. The marker 32 may be mounted on the bottom side of the baffle or housing 34. The tracker 20 may include a light source 47 for illuminating the marker 32 via the mirror 33, enabling the use of a retro-reflective marker 32.

Figure 3C:
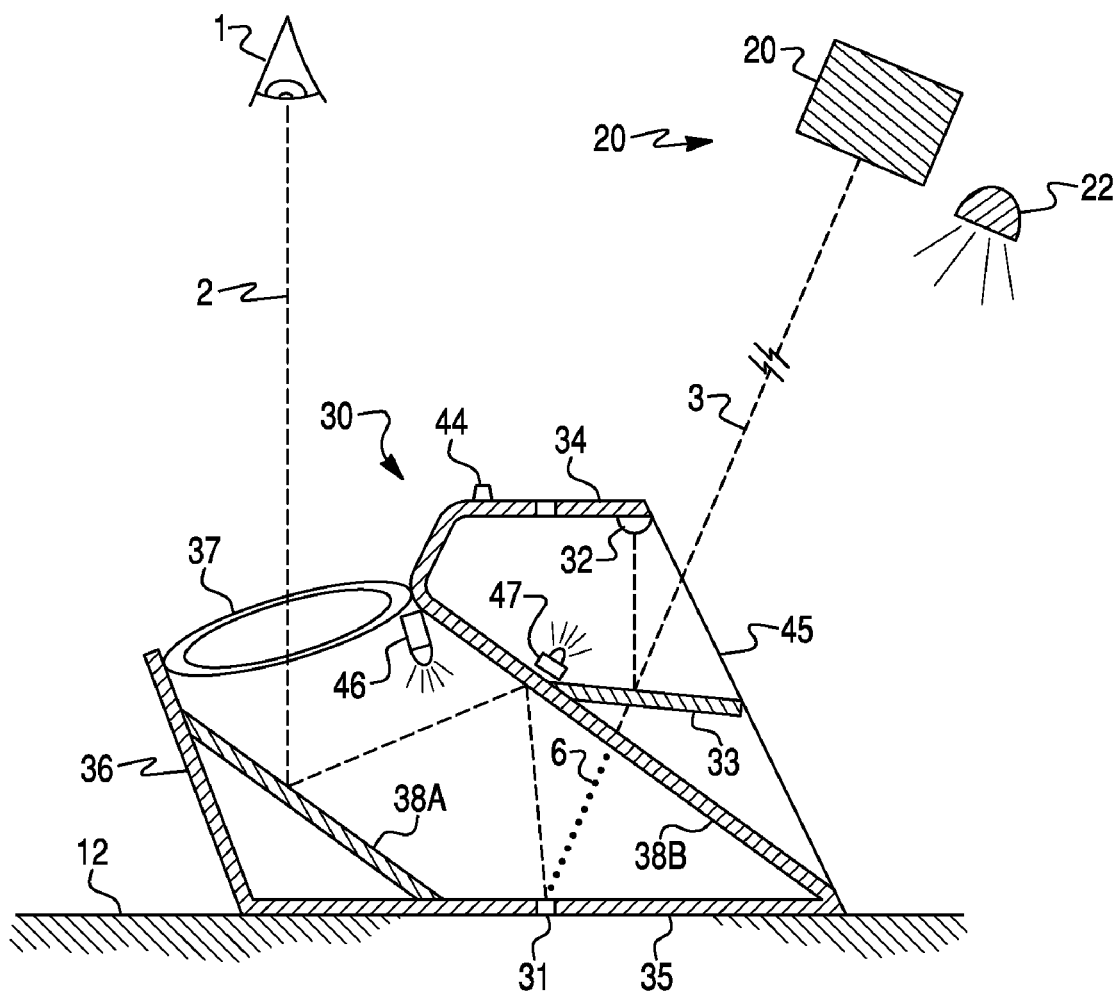
FIG. 3C is a cross-section view from the side of a probe embodiment having a periscope to view the indicator.

Another embodiment of a probe 30 is illustrated in FIG. 3C. Like the embodiment shown in FIGS. 3A and 3B, a mirror 33 is configured within the probe 30 to present a virtual image of the marker 32 to the tracker 20 which is coincident with the location of the indicator 31. In this embodiment, an arrangement of periscope mirrors 38A and 38B provides the user with a better view of the indicator 31, which may not otherwise be directly visible to the user's eye 1. Instead of mirrors 38A, 38B, the periscope may be constructed with one or more prisms, such as a pentaprism similar to that used in a single-lens reflex camera. An embodiment may employ a transparent window instead of a lens 37 to protect the periscope mirrors 38 and/or the base plate 35 from dust, scratches, fingerprints, or smudges. Alternatively, a sliding shutter, removable cap, or a protective coating on the base plate 35 and/or on the periscope mirrors 38 may be used instead of or in addition to a transparent window or a lens 37.

The embodiment illustrated in FIG. 3C allows the user to view the indicator 31 without obstruction while the tracker 20 observes a virtual image of the marker 32 in the same location. Thus, as with the embodiment described above, the tracker 20 measures the location of the marker 32 directly with no need to calculate coordinates of the indicator 31 to account for an offset of the marker 32.

Figure 3D:
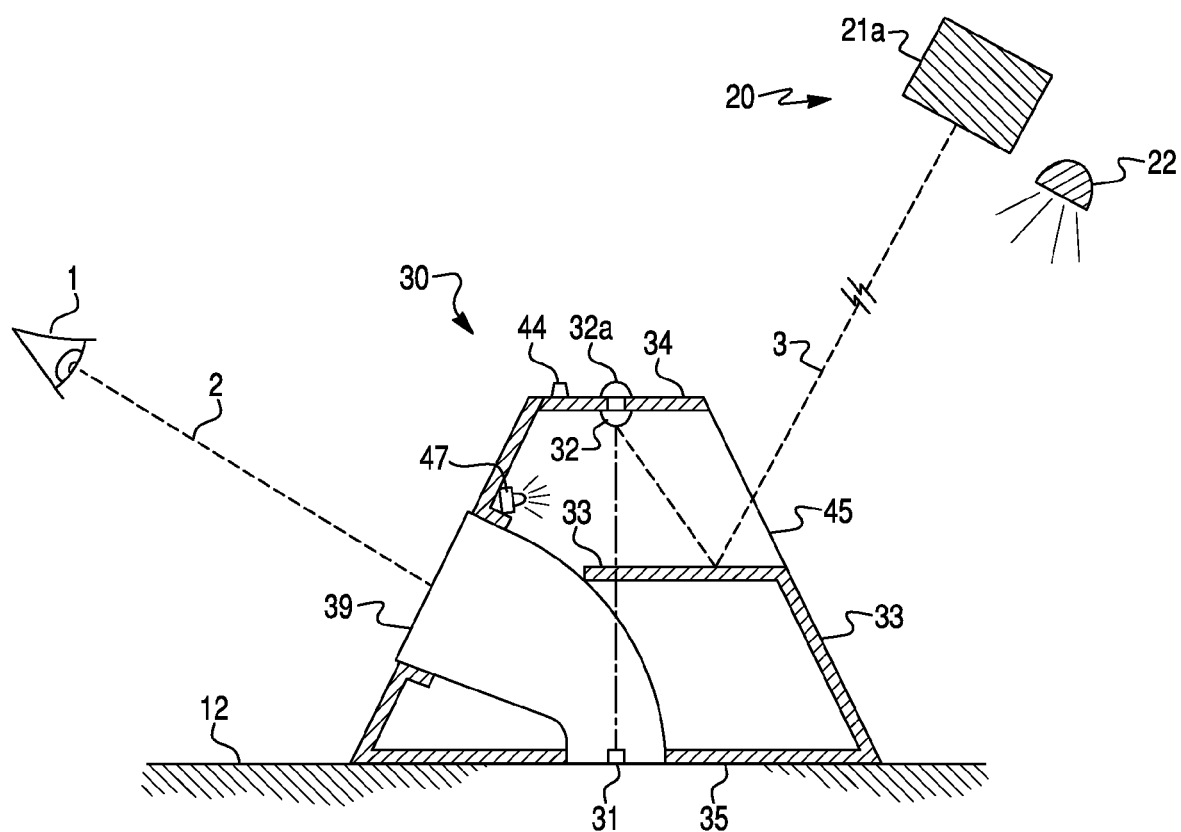
FIG. 3D is a side cross-sectional view of a probe embodiment having a bent, magnifying optical fiber image conduit.

Another embodiment is illustrated in FIG. 3D. This embodiment provides the user with a better view of the indicator 31 by using an optical fiber image conduit 39 acting as both the lens 37 and the base plate 35. The amount of magnification provided the optical fiber image conduit 39 depends on the relative taper between the distal end which contacts the surface 12 and the proximal end closest to the user's eye 1. An embodiment may use a combination of a lens 37, periscope mirrors 38A, 38B or prisms, and/or an optical fiber image conduit 39 to enhance visibility of the indicator 31 by the user 1. It should be appreciated that a periscope configuration and an image conduit 39 not only allow a user to view an image of the indicator 31 and the surface 12, but they also convey ambient light in to illuminate the indicator 31 and the surface 12.

Figure 4:
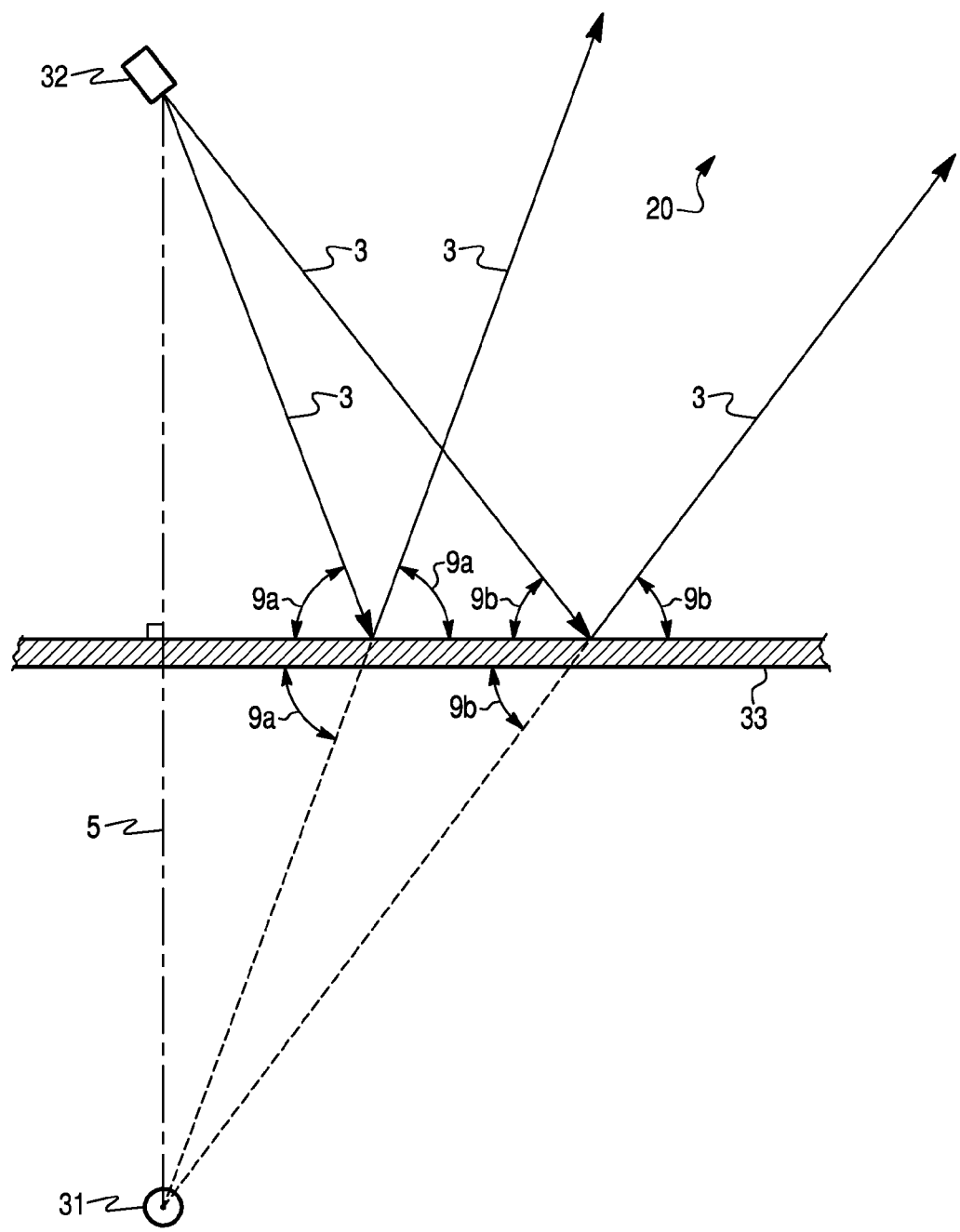
FIG. 4 is a diagram illustrating how the image of a marker is made to virtually coincide with the indicator.

Paths of light emanating from a marker 32 in the direction of a tracker 20 are illustrated in FIG. 4. As illustrated, light from the marker 32 is reflected in the mirror 33 to create a virtual image of the marker 32 that effectively coincides with the physical location of the indicator 31. Light from the marker 32 travels along the lines 3, reflecting off the mirror 33. Because the angle of incidence equals the angle of reflection, the marker 32 appears to tracker 20 to be located behind the mirror 33 at the location of the indicator 31. Since the indicator 31 and marker 32 are positioned equal distance from the reflecting surface of the mirror 33 along a line 5 perpendicular to the mirror 33, the virtual image of the marker 32 at the location of the indicator 31 will be the same distance from the reflecting surface of the mirror 33 as the marker 32 is from the reflecting surface. Therefore, the tracker 20 will measure the location of the virtual image of the marker 32 at the location of the indicator 31.

It should be noted that a similar probe configuration can be provided for an ultrasonic tracker, in which the equivalent of the mirror 33 may be a hard, sound-reflecting surface, and the sonic equivalent of an optical baffle may be a soft, deeply textured surface such as foam. Like light, sound from an ultrasound marker will be reflected off the sound-reflecting surface to create a virtual sonic source.

Some optical 3D trackers 20 may experience problems in circumstances where the line-of-sight to a marker is partially blocked by an intervening object. In such situations the optical tracker 20 may incorrectly measure the location of the marker. For example, if the marker is an LED or a retro-reflective ball, there may be an error in the measured coordinates because the centroid of the portion visible to the tracker 20 is offset from the actual center of the marker. For a one-centimeter retro-reflective ball, the positional error may be more than a millimeter. This problem may also occur with the probe embodiments described herein, such as, for example, when the user's hand partially blocks the line-of-sight from one of the cameras 21a-21c of the tracker 20 to the virtual image of the marker 32. However, conventional trackers 20 may not be able to detect this circumstance and warn the user.

For the probes described herein, there is an addition problematic circumstance in which the virtual image of the marker 32 can be partially blocked. The probe may be oriented so that the virtual image of the marker 32, as observed by a camera 21a-21c of the tracker 20, is reflected off the edge of the mirror 33. In such circumstances the impact on positional accuracy may be the same as when an intervening object partially blocks the line-of-sight to a marker 32.

Figure 5A:
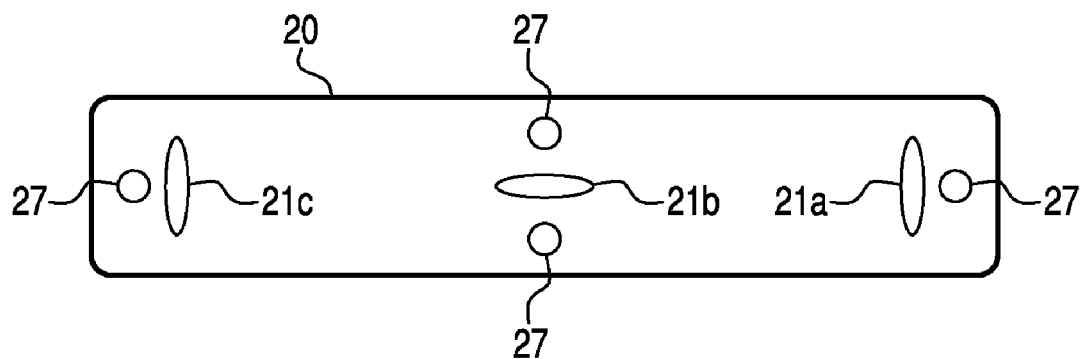
FIGS. 5A and 5B are drawings of two 3D optical trackers with alternative locations for photodiodes.
Figure 5B:
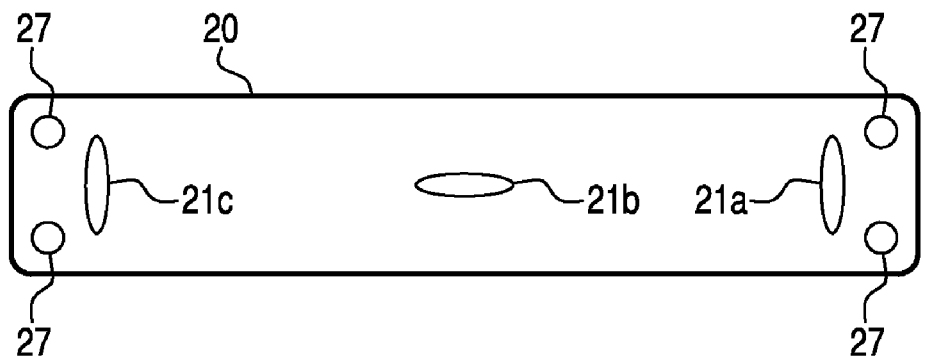

An embodiment of a tracker 20 includes provisions to detect a partially blocked line-of-sight to a marker 32 or to the virtual image of a marker 32. Specifically, photodetectors 27 (which may be photodiodes) may be included on the tracker 20 for use with markers that are active LEDs or retro-reflective balls. FIGS. 5A and 5B show two embodiment arrangements for mounting a plurality of photodetectors 27 on an optical tracker 20 which also includes two or more cameras 21a, 21b, and 21c. The cameras may each be conventional 2D video cameras or linear CCDs, for example. The photodetectors 27 function to detect when a marker 32 (such as an LED or a retro-reflective spot), or the virtual image of a marker 32 may be partially blocked from the sight of at least one camera 21a, 21b, or 21c. When the marker 32 is partially blocked by the edge of some intervening object, at least one photodetector 27 will receive little or no light from the marker 32. The photodetectors 27 can detect this decrease in light and signal the tracker 20 (or the computer 50) to indicate that some partial blockage of light exists. This function will also detect situation in which the marker 32 is only partially reflected, such a because the virtual image of the marker 32, as seen by the tracker 20, falls at the edge of the mirror 33.

For example, if a marker 32 is partially blocked, at least one camera 21a, 21b, or 21c is likely to see only part of the marker 32 while at least one other camera 21a, 21b, or 21c will see the entire marker. Similarly, the photodetectors 27 will detect unequal intensities of light, as may be determined by circuits which compare the intensities detected by at least two photodetectors 27. Because the photodetectors 27 are mounted slightly outward from the cameras 21a, 21b, 21c, the photodetectors may detect a problematic circumstance before the cameras 21a, 21b, 21c are affected. If all the photodetectors 27 receive approximately the same intensity of light from a marker 32, then in general all cameras will see the entire marker 32. When at least two photodetectors 27 receive substantially different light intensities, the tracker 20 can warn the user of a potentially inaccurate measurement, such as by causing the status light 44 to flash. Similarly, the photodetectors 27 can detect partial blockage of the virtual image of a marker 32. While the photodetectors are optional, they may be used to warn the user of potentially inaccurate results in these problematic circumstances.

Because of the practical area of the mirror 33 may be limited, the embodiments described previously may have a limited range of angles in which the virtual image of the marker 32 in the mirror 33 is fully visible to the tracker 20. This visibility limitation may be partially addressed by moving or rotating the tracker 20 to a different viewpoint, but that may not be convenient or possible while maintaining the coordinate system. To address this limitation, alternative embodiments may be used which have better virtual image visibility. These embodiments operate on the same principle as the foregoing embodiments by maintaining three geometric relationships between the indicator 31, the marker 32, the mirror 33 and the tracker 20:

1. The marker 32 and the indicator 31 have the same distance from the planar reflecting surface of the mirror 33;

2. The line between the marker 32 and the indicator 31 is perpendicular to the reflecting surface of the mirror 33; and 3. The image of the marker 32 in the mirror, though not the marker 32 itself is be directly visible to the tracker 20.

These geometric relationships can be maintained even if part of the probe 30 is hinged or moveable with respect to the base plate 35 or to the rest of the probe 30.

Figure 6A:
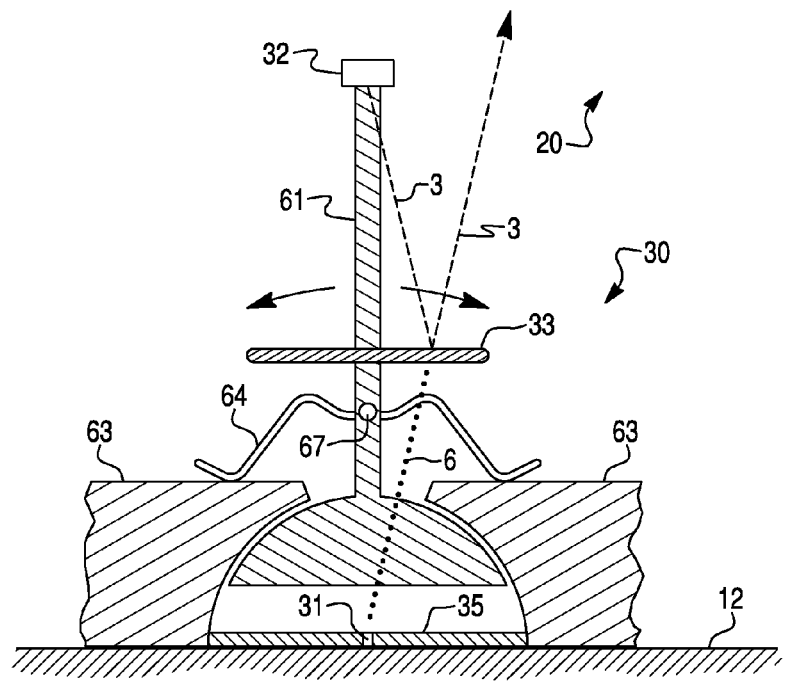
FIG. 6A is a cross-sectional view of a probe embodiment having a movable marker and mirror assembly.

A first of these alternative embodiments is illustrated in FIG. 6A which maintains the above geometric relationships. This embodiment includes a structural base 63 with a spherical bearing portion 63A which accommodates a marker support 61 suspended by leaf springs 64. A transparent base plate 35 connected to the bottom of the structural base 63 includes an indicator 31. While the structural base 63, the transparent base plate 35, and the indicator 31 remain in contact with the surface 12, the marker support 61 may be moved within the spherical bearing portion 63A so that the marker 32 can trace a portion of a sphere even as the geometric relationships listed above are maintained. Specifically, the indicator 31 and the marker 32 remain equidistant from the mirror 33, the line between the indicator 31 and the marker 32 remains perpendicular to the mirror 33, and the marker 32 cannot be seen directly by the tracker 20, because the marker 32 faces the mirror 33. A leaf or cup spring 64 keeps the spherical bearing portion of the marker support 61 in contact with the mating spherical portion of the structural base 63 by pushing against a pin 67. While the structural base 63 and the indicator 31 remain fixed, the marker support 61 may be rotated and moved to an orientation where the tracker 20 gets an unobstructed view of the virtual image of the marker 32.

Another probe embodiment is illustrated in which includes semicircular arc 65 coupled to the transparent base plate 35 which includes an indicator 31, and slider 66 coupled to the semicircular arch 65 and a marker 32, a mirror 33 configured to maintain the geometric relationships described above. In this embodiment, the slider 66 includes a marker support 61 that keeps the marker 32 at a constant distance from the mirror 33. The slider 66 maintains contact with the circular arch 65 so that the mirror 33 remains at a constant distance from indicator 31 at the center of the circular arch 65. The slider 66 is designed with guides or grips to keep it in contact with the arch 65 as the slider is moved along the arch 65. The slider 66 and the marker support 61 insure that the marker 32 and the indicator 31 are equidistant from the reflecting surface of mirror 33 and the line 5 between the marker 32 and the indicator 31 remains perpendicular to the mirror 33. Thus, the arch 65, slider 66, and marker support 61 insure that the geometric relationships described above are maintained as the slider 66 and marker support 61 are moved along the arch 65. As such, the embodiment insures that the virtual image of the marker 32 as viewed by a tracker 20 always coincides with the physical location of the indicator 31. While the arch 65 and the indicator 31 remain fixed, the marker support 61 can be moved to an angle where the tracker 20 can have an unobstructed view of the virtual image of the marker 32.

Figure 6B:
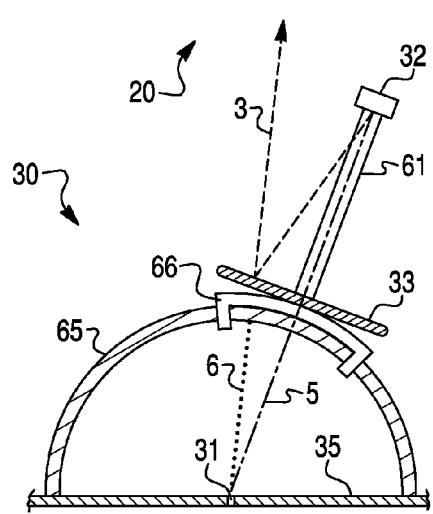
FIGS. 6B and 6C are front and side views respectively of an alternative probe embodiment having a moveable marker and mirror assembly.
Figure 6C:
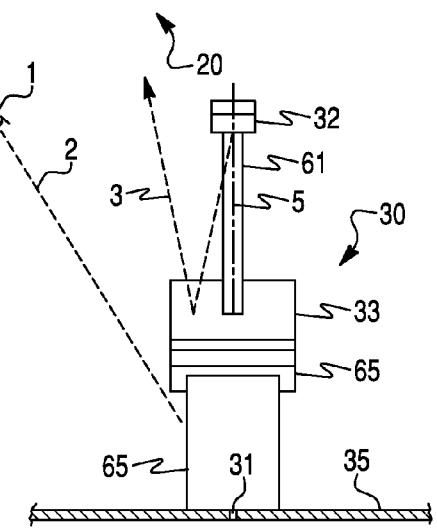

The embodiments illustrated in FIGS. 6A through 6C may use transparent glass or plastic base plate 35 with an indicator 31. Alternatively, the base plate 35 may be slab of an optical fiber image conduit which avoids refraction which can otherwise shift the apparent location of the indicator 31 and/or points on the surface 12 as the user shifts viewing perspective.

Figure 7A:
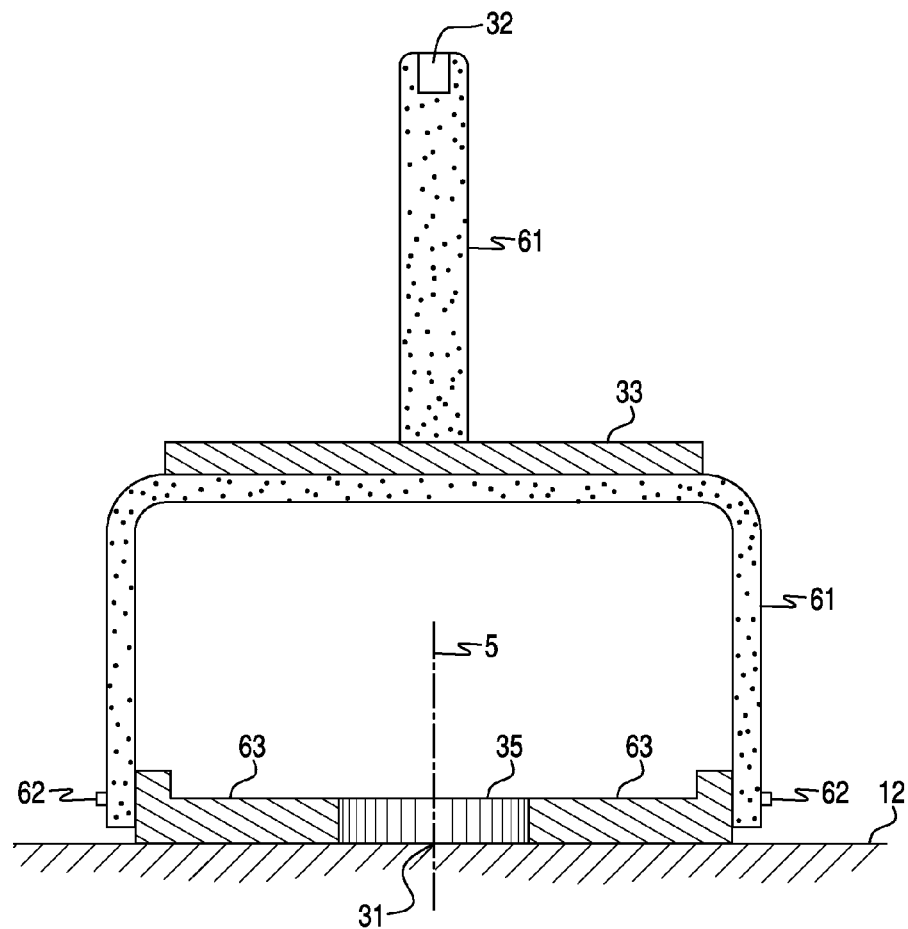
FIGS. 7A and 7B are front and side cross-sectional views respectively of another alternative embodiment with a moveable marker and mirror assembly
Figure 7B:
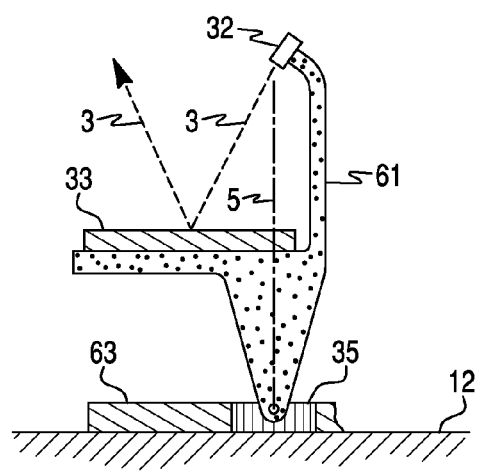

A further embodiment of a probe 30 is illustrated in FIGS. 7A and 7B. This embodiment employs a hinge-like articulated mechanical arrangement in which a hinged mirror and marker support 61 rotates about the axis of hinge pins 62. The axis of the hinge pins 62 intersects the indicator 31. Because the pins are above the surface 12, the base plate 35 is an optical fiber image conduit, which in effect optically raises the points on surface 12, including the indicator 31, to the level of the axis of the pins 62. The hinge pins 62 on the mirror and marker support 61 insures that the marker 32 and the indicator 31 are equidistant from the reflecting surface of mirror 33 and the line 5 between the marker 32 and the indicator 31 remains perpendicular to the mirror 33. Thus, this embodiment maintains the geometric relationships described above. Accordingly, the virtual image of the marker 32 coincides with the indicator 31 because all light rays 3 emitted from marker 32 reaching the tracker 20 appear to originate from the location of the indicator 31. While the base 63 and the indicator 31 remain fixed, the mirror and marker support 61 may be moved to an angle where the tracker 20 can have an unobstructed view of the virtual image of the marker 32.

While the foregoing embodiments are intended for use on a planar surface 12, base plate 35 (or the structural base 63) of a probe 30 need not be planar if the base plate 35 (or the structural base 63) has a surface shape which matches a non-planar measurement surface 12. For example, if the measurement surface 12 is spherical with a radius R, the base plate 35 may have a mating spherically concave surface with a radius R. Such a probe 30 may be useful in manually designating a location on a globe, for example. Similarly, if the surface 12 is cylindrical, the base plate 35 (or the structural base 63) may have a mating, cylindrical curvature.

Figure 8:
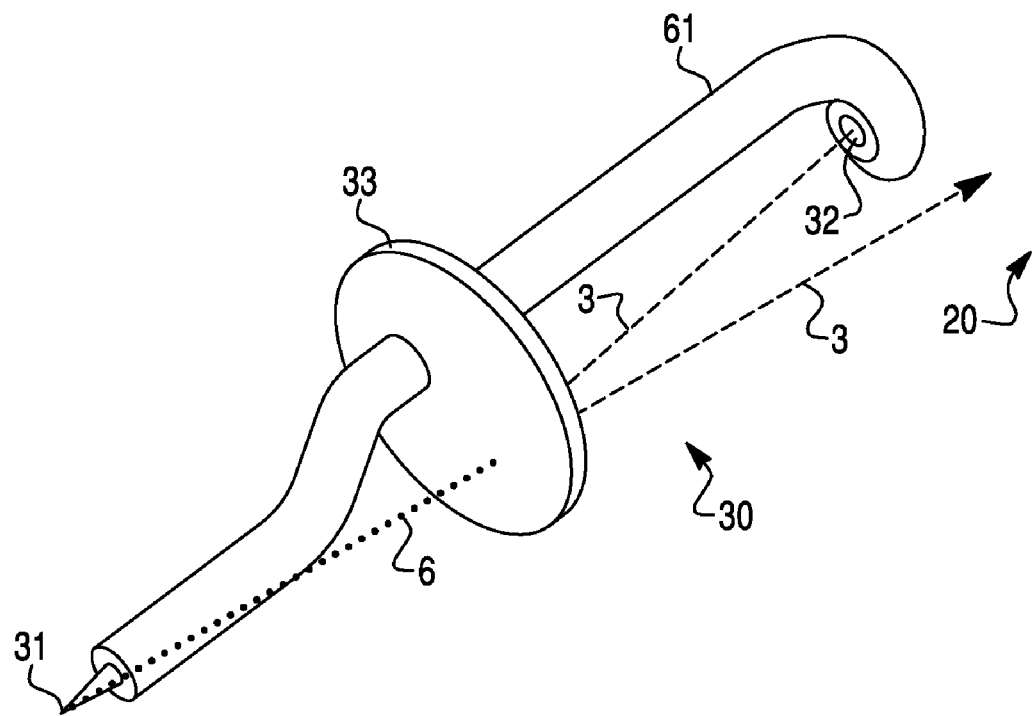
FIG. 8 is a perspective view of a probe for use in indicating a point on a 3D surface.

A further embodiment appropriate for indicating points on a 3D surface is illustrated in FIG. 8. This probe embodiment satisfies the same geometric relationships as described above. Specifically, the probe 30 has an indicator 31 in the form of a sharp pointing tip, a marker 32, and a mirror 33 arranged so that the indicator 31 and marker 32 are equidistant from the reflective surface of the mirror 33 and positioned along a line perpendicular to the mirror 33. Consequently, the virtual image of marker 32 appears to coincide with the indicator 31 because all light rays 3 emitted from marker 32 reaching tracker 20 appear to originate from the location of the indicator 31 along the virtual ray 6. The marker 32 may be oriented to face the mirror 33, so that it cannot be observed directly by tracker 20.

An alternative embodiment of the probe 30 may replace the sharp pointing indicator tip with a spherical tip of known radius. In this case, the indicator 31 is the center of the sphere. The probe 30 would be used in the same way as a spherical sensing tip on a coordinate measuring machine (CMM). That is, the indicator 31 at the center of a sphere never actually touches the surface of some 3D object which is being digitized but maintains a constant distance from the surface. Subsequent software processing adjusts the measured coordinates to account for the offset of the center of the spherical tip from its surface. Digitizing surfaces using a probe with a spherical tip is well known in the art of 3D coordinate measurement.

Figure 9:
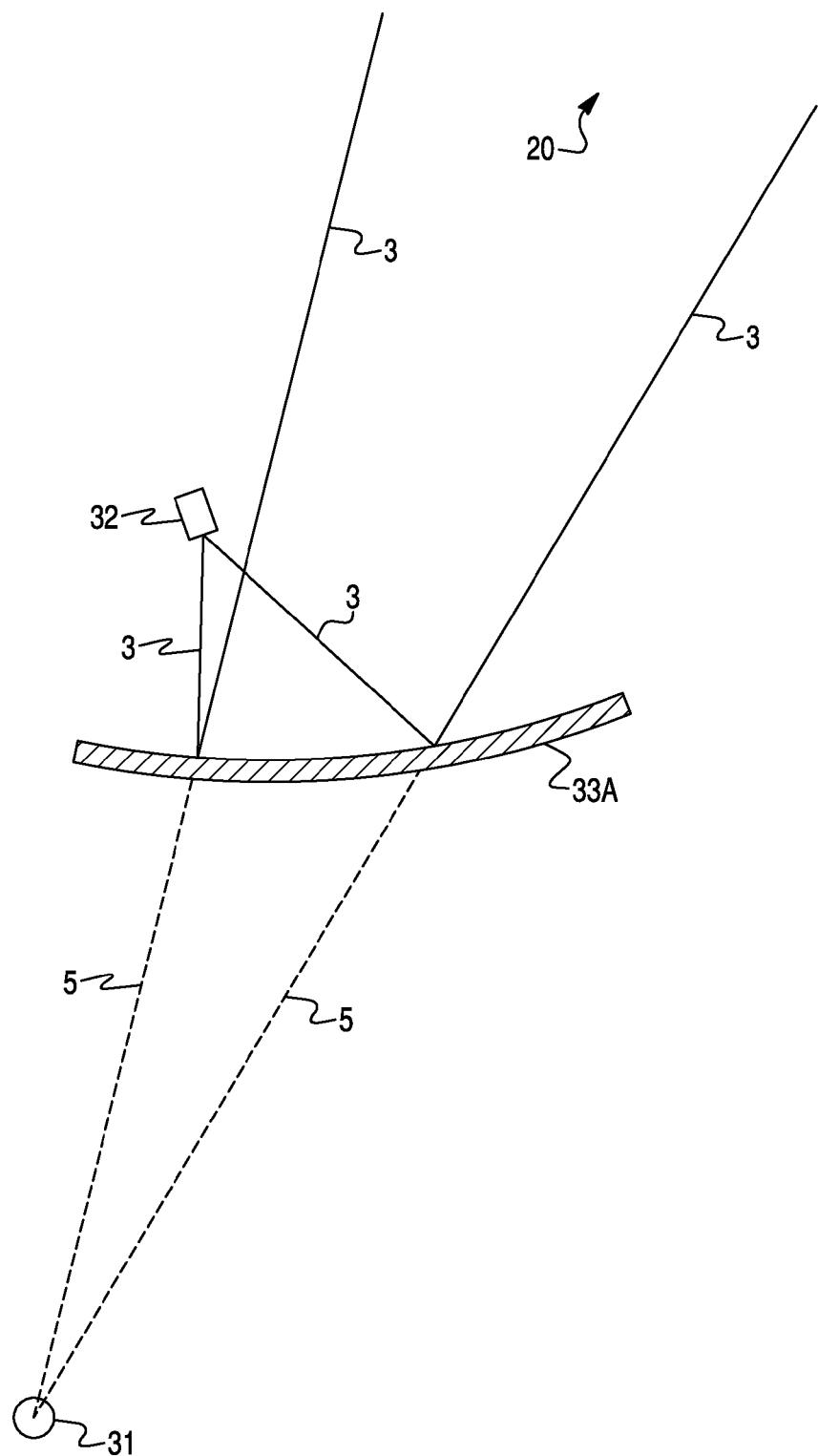
FIG. 9 is a cross-sectional diagram illustrating how the image of a marker is made to virtually coincide with the indicator using a curved mirror.

In the various embodiments, the mirror 33 need not be planar. Instead, a curved mirror 33A may be used as illustrated in FIG. 9. As shown, light from the marker 32 travels along the lines 3, reflecting off the mirror 33A. However, to the tracker 20, the light appears to come from the indicator 31 where the virtual image of the marker 32A appears, traveling along the lines 5. The geometric relationships listed above do not hold for a non-planar mirror. Instead, the marker 32 will be placed at a location with respect to the curved mirror so that its virtual image optically appears to be at the same location as the indicator 31. The distance between the marker 32 and the curved mirror 33A will not equal the distance between the indicator 31 and the curved mirror, and instead the distances will depend on the curvature of the mirror 33A. Persons of ordinary skill in optics can design the mirror 33A and choose the distances so that the location of the virtual image is invariant and coincides with the indicator 31 regardless of where the tracker 20 is located. Using a curved mirror may provide more compact optical paths so a probe 30 having a curved mirror may be more compact. Although the curved mirror 33A shown in FIG. 9 is concave, a convex mirror may be used instead. The mirror 33A may be a section of a sphere, paraboloid or another curved surface. The mirror 33A may be a first-surface mirror to avoid secondary reflections. It should be noted that the virtual image of the marker 32 in a curved mirror will not be the same size as the actual marker 32A. For some kinds of trackers 20, this change in size may be problematic. For example, a retro-reflective ball may appear larger or smaller than expected. To address this problem, the size of the marker may be adjusted so that the virtual image of the marker is the proper size.

The probe embodiments described so far require only one marker 32 to be tracked. Since the virtual image of the marker 32 is tracked and appears to be exactly at the physical location of the indicator 31, no further markers are required for determining the location of the indicator 31. Consequently, the foregoing probe embodiments are shown as being circular in configuration since their rotational orientation is not of significance. However, if the probe 30 is not rotationally symmetrical for a 2D application (e.g., it can point in the direction of a line as well as reveal the location of a point on the line) or additional information is required regarding the shape of a 3D object (e.g., the normal to the surface) the tracker 20 must be able to determine the angular orientation of the probe 30 as well as the location of the indicator 31. To enable the tracker 20 to obtain this additional information, at least one more marker 32a on the probe 30 may be required. The additional marker or markers 32a, 32b are referred to herein as secondary markers, while the marker 32 whose virtual image coincides with the indicator 31 is referred to herein as the primary marker.

For example, FIGS. 10A and 10B illustrate probe 30 embodiment which includes two secondary markers 32a, 32b. The markers 32a, 32b are located on the probe 30 in positions which enable the tracker 20 to determine the probe's rotational orientation, such as one secondary marker 32a on top of the housing 34 and another secondary marker 32b elsewhere on the housing 34. The secondary markers 31a, 32b may be spaced apart from the virtual image of the primary marker 32 and from each other in order to enable the tracker 20 to resolve and measure the relative positions of each marker.

The location coordinates of the virtual image of the marker 32 and a single secondary marker 32b may be used to determine the orientation of the probe in a 2D coordinate system. In a 3D coordinate system, at least two secondary markers 32a and 32b are required in order to determine its position and orientation with respect to the three dimensions of space plus the three rotational orientations (i.e., pitch, roll and yaw) that the probe 30 can assume. The secondary markers 32a or 32b need not be reflected in the mirror 33 since there is no need to create a virtual image of the markers in order to avoid obscuring the indicator 31. It should be noted that although the primary marker 32 and the secondary marker 32a are shown as being physically located close to each other in FIGS. 10A and 10B, the virtual image of the primary marker 32 as seen by the tracker 20 is at the indicator 31, and thus will be seen as well removed from the secondary marker 32a.

When two or more secondary markers 32a and 32b are positioned on a probe 30, it may be advantageous to provide a way for the tracker 20 to distinguish among them. One way to distinguish multiple markers 32, 32a, and 32b is to insure that they form an irregular pattern so that the measured locations of all the markers 32, 32a, and 32b can exactly match only one orientation. Another way to distinguish among markers is to make them appear different to the tracker 20, such as by means of color, shape or other feature. For example, if the markers 32, 32a, 32b are active LEDs, the LEDs may be flashed in a predetermined sequence or at times controlled by the tracker 20 to uniquely identify each marker. These and other ways of distinguishing markers commonly known in commercially available trackers 20 may be used.

In an embodiment, the probe may be configured so that the tracker can view both the primary marker 32 itself and the virtual image of the primary marker 32 (i.e., the marker 32 as observed in the mirror 33) to provide two separate, spaced-apart markers. In this embodiment, the virtual image of the marker 32 will appear at the same location as the indicator 31, while the marker 32 itself will be imaged at its actual location. For example, in the probe 30 shown in FIGS. 10A and 10B, the marker 32 may simply protrude through the top baffle or housing 34 to also double as the secondary marker 32a.

For each of the single marker embodiments described above, at least one secondary marker 32a or 32b may be added. For example, the embodiment illustrated in FIGS. 10A and 10B is very similar to the embodiment illustrated in FIGS. 3A and 3B except for the addition of the secondary markers 32a and 32b.

Besides providing orientation information, the secondary markers 32a may also be used to verify the measurements of the primary marker 32. For example, the computed distances between the measured locations of all the markers (primary and secondary) may be compared to the known distances between the markers on a probe 30. If the distances between the measured marker separations differ from the known distances by more than a small tolerance, then a measurement problem is indicated. Such consistency checks are well known to persons of ordinary skill in the art of optical digitizing.

Figure 11:
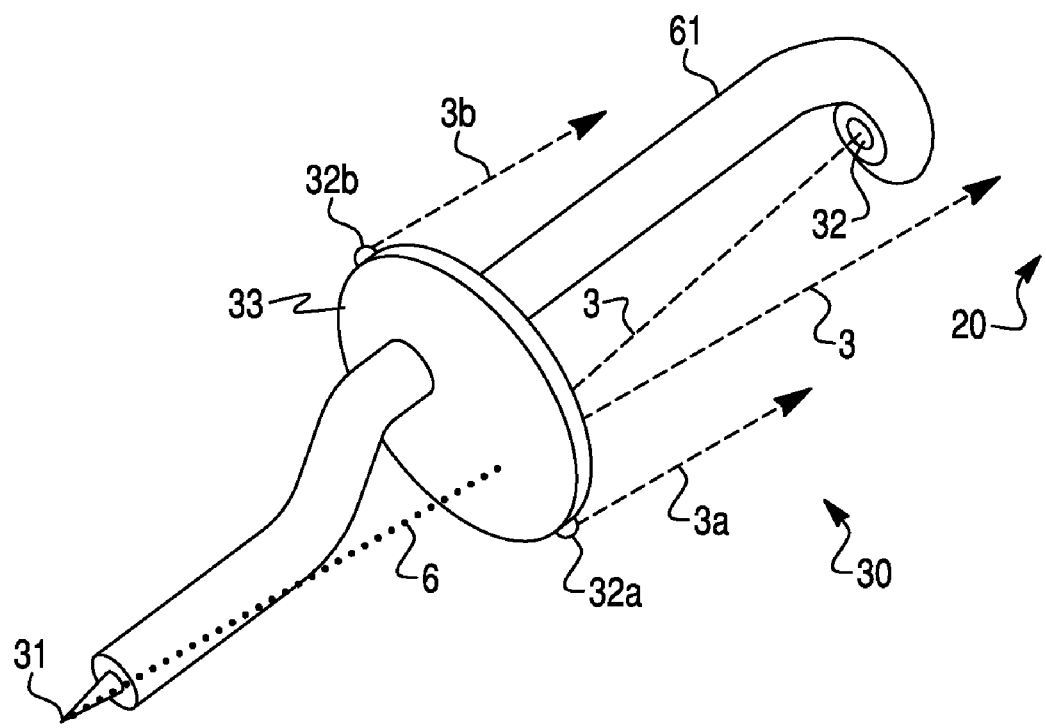
FIG. 11 is a perspective view of a probe with two secondary markers.

Further, the orientation information provided by the secondary markers may be used to compensate for known orientation-related systematic errors-especially in 3D applications. For example, FIG. 11 illustrates an embodiment with a primary marker 32 and two secondary markers 32a and 32b. The three markers 32, 32a, 32b are not collinear, so the 3D spatial orientation of the probe 30 may be determined by the tracker 20. If the mirror 33 is not a first-surface mirror, the distance of the virtual image of the marker 32 may vary slightly depending on the orientation angle of the mirror 33 relative to the tracker 20. The orientation angle may be represented as the angle between a light ray 3 and the plane of the mirror 33. By determining the orientation of the probe 30, the tracker 20 (or the attached computer 50) may compensate for the effect of refraction on the apparent location of the virtual image may be estimated by means of Snell's Law with the result used to compute a correction to the apparent location to generate the actual location of the indicator 31.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

We claim

1. A method for measuring a location of an indicator on a probe, comprising:
    providing a marker and a mirror, wherein the mirror has a curved reflective surface;
    forming a virtual image of the marker behind the mirror, where the virtual image has an image location;
    maintaining a fixed relative relationship among the marker, the indicator and the mirror, wherein the image location of the virtual image coincides with the location of the indicator;
    measuring the image location of the virtual image of the marker using a tracker; and
    representing the location of the indicator with coordinates based on the image location of the virtual image of the marker.

2. The method of claim 1, wherein maintaining a fixed relative relationship among the marker, the indicator and the mirror includes mounting the marker, the indicator, and the mirror on a probe in a fixed geometric relationship to each other.

3. The method of claim 2, further comprising allowing at least two parts of the probe to move relative to each other.

4. The method of claim 1, further comprising providing a source of illumination for the marker.

5. The method of claim 1, further comprising providing a baffle to prevent direct measurement of the marker by the tracker.

6. The method of claim 1, further comprising:
measuring a location of a secondary marker positioned on the probe in a fixed relationship to the mirror, the virtual image of the marker, and the indicator; and
determining a spatial orientation of probe based upon the measured locations of the image location of the virtual image of the marker, the measured location of the secondary marker and the fixed relationship.

7. A probe for indicating a location to a tracker, comprising:
an indicator on the probe for indicating a location;
an optical fiber image conduit configured to provide a view of the indicator;
a marker on the probe; and
a reflective surface on the probe for forming a virtual image of the marker, wherein the indicator, marker, and reflective surface are positioned on the probe and configured so that a location of the virtual image of the marker can be measured by the tracker and the location of the virtual image of the marker coincides with the location of the indicator.

8. The probe of claim 7, wherein the reflective surface is provided by a prism.

9. The probe of claim 7, wherein the reflective surface comprises a mirror.

10. The probe of claim 9, wherein the mirror is a first-surface mirror.

11. The probe of claim 7, wherein the marker is an optical marker that can be imaged by the tracker.

12. The probe of claim 7, further comprising a periscope configured to provide a view of the indicator.

13. The probe of claim 7, further comprising a source of illumination for the marker.

14. The probe of claim 7, further comprising a baffle to prevent direct measurement of the marker by the tracker.

15. The probe of claim 7, wherein the probe is configured so that the marker and reflective surface can move around an axis of rotation but the location of the virtual image of the marker remains coincident with the location of the indicator.

16. The probe of claim 7, further comprising a secondary marker having a location on the probe which the tracker can measure that is in a fixed geometric relationship to the reflective surface, the virtual image, and the indicator, thereby indicating a spatial orientation of the probe.

17. A method for measuring a location of an indicator on a probe, comprising:
providing a marker and a mirror;
providing a periscope for viewing the indicator,
forming a virtual image of the marker behind the mirror, where the virtual image has an image location;
maintaining a fixed relative relationship among the marker, the indicator and the mirror, wherein the image location of the virtual image coincides with the location of the indicator;
measuring the image location of the virtual image of the marker using a tracker; and
representing the location of the indicator with coordinates based on the image location of the virtual image of the marker.

18. The method of claim 17, wherein maintaining a fixed relative relationship among the marker, the indicator and the mirror includes mounting the marker, the indicator, and the mirror on a probe in a fixed geometric relationship to each other.

19. The method of claim 18, further comprising allowing at least two parts of the probe to move relative to each other.

20. The method of claim 17, wherein the mirror is replaced with a prism.

21. The method of claim 17, further comprising providing a source of illumination for the marker.

22. The method of claim 17, further comprising providing a baffle to prevent direct measurement of the marker by the tracker.

23. A method for measuring a location of an indicator on a probe, comprising:
providing a marker and a mirror;
forming a virtual image of the marker behind the mirror, where the virtual image has an image location;
maintaining a fixed relative relationship among the marker, the indicator and the mirror, wherein the image location of the virtual image coincides with the location of the indicator;
measuring the image location of the virtual image of the marker using a tracker;
providing a baffle to prevent direct measurement of the marker by the tracker; and
representing the location of the indicator with coordinates based on the image location of the virtual image of the marker.

24. The method of claim 23, wherein maintaining a fixed relative relationship among the marker, the indicator and the mirror includes mounting the marker, the indicator, and the mirror on a probe in a fixed geometric relationship to each other.

25. The method of claim 24, further comprising allowing at least two parts of the probe to move relative to each other.

26. The method of claim 23, wherein the mirror is replaced with a prism.

27. The method of claim 23, further comprising providing a source of illumination for the marker.

28. A method for measuring a location of an indicator on a probe, comprising:
providing a marker and a mirror;
forming a virtual image of the marker behind the mirror, where the virtual image has an image location;
maintaining a fixed relative relationship among the marker, the indicator and the mirror, wherein the image location of the virtual image coincides with the location of the indicator;
measuring the image location of the virtual image of the marker using a tracker;
representing the location of the indicator with coordinates based on the image location of the virtual image of the marker;
measuring a location of a secondary marker positioned on the probe in a fixed relationship to the mirror, the virtual image of the marker, and the indicator; and
determining a spatial orientation of probe based upon the measured locations of the image location of the virtual image of the marker, the measured location of the secondary marker and the fixed relationship.

29. The method of claim 28, wherein maintaining a fixed relative relationship among the marker, the indicator and the mirror includes mounting the marker, the indicator, and the mirror on a probe in a fixed geometric relationship to each other.

30. The method of claim 29, further comprising allowing at least two parts of the probe to move relative to each other.

31. The method of claim 28, wherein the mirror is replaced with a prism.

32. The method of claim 28, further comprising providing a source of illumination for the marker.

33. A probe for indicating a location to a tracker, comprising:
- an indicator on the probe for indicating a location;
- a periscope configured to provide a view of the indicator;
- a marker on the probe; and
- a reflective surface on the probe for forming a virtual image of the marker, wherein the indicator, marker, and reflective surface are positioned on the probe and configured so that a location of the virtual image of the marker can be measured by the tracker and the location of the virtual image of the marker coincides with the location of the indicator.

34. The probe of claim 33, wherein the reflective surface is provided by a prism.

35. The probe of claim 33, wherein the reflective surface comprises a mirror.

36. The probe of claim 33, wherein the marker is an optical marker that can be imaged by the tracker.

37. The probe of claim 36, wherein the probe is configured so that the marker and reflective surface can move around an axis of rotation but the location of the virtual image of the marker remains coincident with the location of the indicator.

38. A probe for indicating a location to a tracker, comprising:
- an indicator on the probe for indicating a location;
- a marker on the probe;
- a baffle to prevent direct measurement of the marker by the tracker; and
- a reflective surface on the probe for forming a virtual image of the marker, wherein the indicator, marker, and reflective surface are positioned on the probe and configured so that a location of the virtual image of the marker can be measured by the tracker and the location of the virtual image of the marker coincides with the location of the indicator.

39. The probe of claim 38, wherein the marker is an optical marker that can be imaged by the tracker.

40. The probe of claim 38, wherein the probe is configured so that the marker and reflective surface can move around an axis of rotation but the location of the virtual image of the marker remains coincident with the location of the indicator.

41. A probe for indicating a location to a tracker, comprising:
- an indicator on the probe for indicating a location;
- a marker on the probe;
- a reflective surface on the probe for forming the virtual image of the marker, wherein the indicator, marker, and reflective surface are positioned on the probe and configured so that a location of the virtual image of the marker can be measured by the tracker and the location of the virtual image of the marker coincides with the location of the indicator; and
- a secondary marker having a location on the probe which the tracker can measure that is in a fixed geometric relationship to the reflective surface, the virtual image, and the indicator, thereby indicating a spatial orientation of the probe.

42. The probe of claim 41, wherein the probe is configured so that the marker and reflective surface can move around an axis of rotation but the location of the virtual image of the marker remains coincident with the location of the indicator.

* * * * *